3,168,357
JOURNALLING DEVICE FOR SUPPORTING ROLLERS

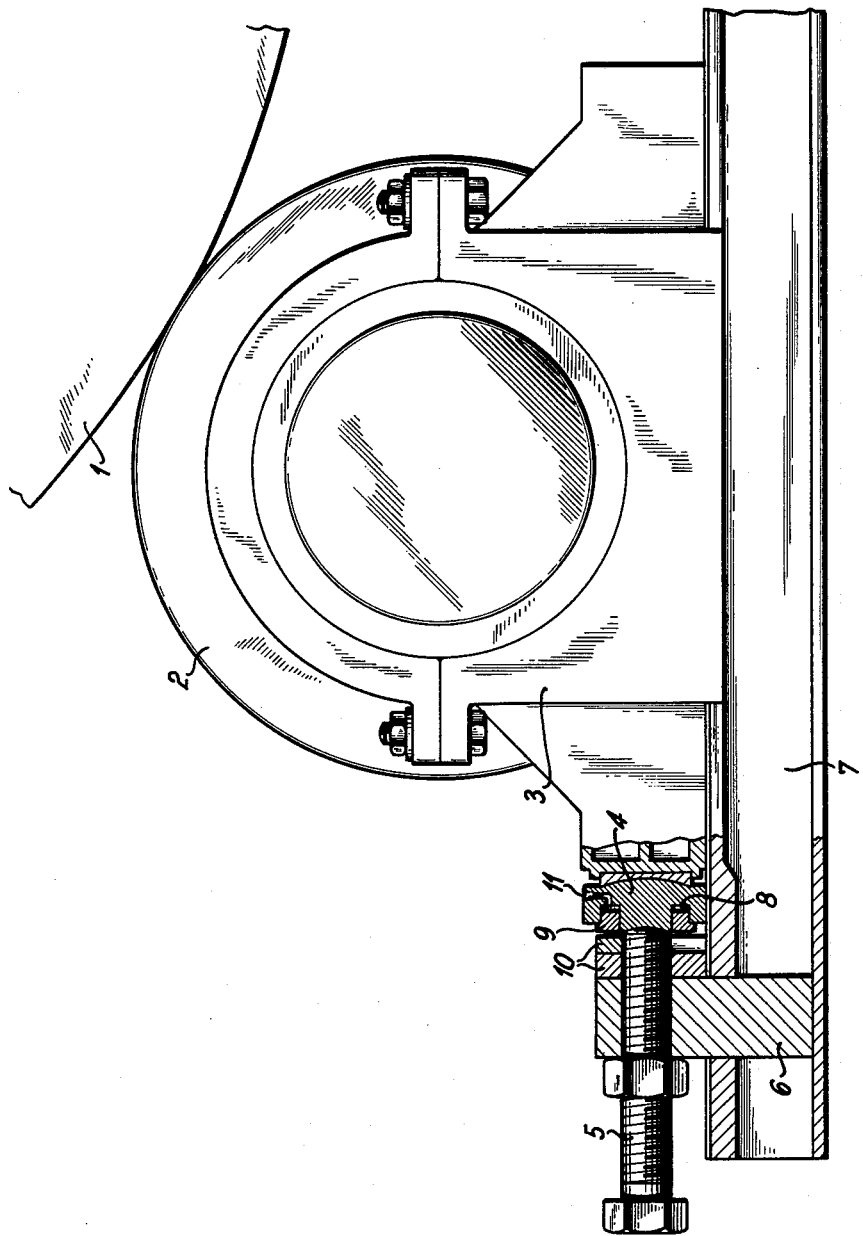

Fritz Mornigkeit, deceased, late of Bochum-Harpen, Germany, by Hedwig Mornigkeit, administrator, Bochum-Harpen, Germany, assignor to Westfalia Dinnendahl Groppel Aktiengesellschaft, Bochum, Germany, a corporation of Germany
Filed May 1, 1963, Ser. No. 277,675
1 Claim. (Cl. 308—15)

The invention relates to a journalling device for a supporting roller of a rotary kiln, tube mill or the like rotatable cylindrical drum structure.

To prevent such elongated rotary drums from sagging, they are supported on rollers journalled for rotation about horizontal axes at lateral localities of axial sectional planes of the drum structure. In operation, the supporting rollers, as well as their path of engagement along the periphery of the drum, becomes subject to wear and it may also happen, particularly in mining areas, that the foundation of the journalling device will sag or shift. This causes asymmetrical loads in the roller bearings, thus resulting in operational trouble or reducing the useful life of the device. To avoid such deficiencies and for compensating any lowering of the foundation, the bearing blocks for the supporting rollers have been displaceably mounted on a base plate to permit shifting them transversely to the drum axis. For lifting the drum, the supporting rollers can be displaced toward the drum, whereas displacement in the opposite direction causes the drum to be lowered or permits disengaging the supporting roller from the drum periphery for repair or replacement.

Such displacing motion can be controlled in known manner by rotation of set screws, or by hydraulic cylinders kept under continuous pressure to force the supporting rollers against the drum periphery. Set screws have the advantage that the bearing block can be arrested on the base plate in any desired position. However, due to the high frictional resistance on the mutually engaging surfaces of the base and the bearing block, considerable mechanical forces must be applied to the set screw when the bearing block is being pushed against or beneath the drum. In contrast thereto, a hydraulic displacing device is more readily capable of providing for a short interval of time the working pressure required for the displacement, but such pressure must be maintained during the entire operating period of the drum to secure a uniform pressure of the supporting roller against the drum wall.

It is an object of the invention to provide a journalling device for the supporting roller of a rotary kiln, tube mill or the like cylindrical drum structure that combines the advantages of hydraulic and mechanical adjustability of the roller bearing without entailing the disadvantages of the known displacing devices.

According to the invention, the displaceable bearing block of the supporting roller rests against an intermediate rigid member which is thus forced against a set screw adjustable in an abutment structure of the base upon whose surface the bearing block is slidably displaceable; and the just-mentioned intermediate member is provided with an annular hydraulic cylinder chamber engaged by an annular piston and provided with a channel for supply of pressure medium such as oil or other pressure fluid. The annular piston, preferably extending in coaxial relation to the set screw, faces the above-mentioned abutment and is forced against it when pressure medium is applied to the annular cylinder chamber. For temporarily relieving the set screw, the annular cylinder chamber is connected to a source of pressure medium so that the annular piston is displaced and forced toward the abutment.

The above-mentioned and more specific features of the invention, as well as the advantages thereof, will be apparent from the following description in conjunction with the accompanying drawing in which a journalling device according to the invention is illustrated by a part-sectional view in a direction parallel to the rotational axis of the supporting roller and hence also parallel to the rotational axis of the rotary kiln or other drum structure being supported by the roller.

According to the figure, a rotatable drum structure 1, such as a rotary kiln, is supported by laterally mounted rollers of which one is shown at 2. The roller 2 is journalled on a bearing block 3 which is horizontally slidable on a base plate 7 and rests laterally against an intermediate rigid member 4 thus forcing it toward a set screw 5 in threaded engagement with an abutment 6 of the base plate. The intermediate member 4 forms an annular cylinder chamber 8 facing toward the abutment 6 and containing a coaxial annular piston 9. Inserted between the piston 9 and the abutment 6 are U-shaped shim plates 10. The annular chamber 8 communicates with a channel 11 for supplying pressure medium into the cylinder chamber.

The bearing block 3 is displaceable on the base plate 7 a sufficient distance to permit forcing the roller 2 against the drum 1 as required for somewhat lifting the drum. When the roller 2 is displaced in the opposite direction, the drum 1 is correspondingly lowered and, if desired, the roller 2 can then be disengaged from the drum wall for repair or replacement. The forces which, due to the weight and rotary motion of the drum 1, act upon the supporting roller 2 and the bearing block 3 are transmitted to the base plate 7 by the intermediate member 4, the set screw 5 and the abutment 6. The intermediate member 4 has a spherical cavity at the side facing the set screw 5, and has a spherical bulge at the opposite side.

In order to relieve the set screw 5 during displacing operation, pressure liquid such as oil is supplied through the channel 11 to the annular chamber 8 in the intermediate member 4. As a result, the bearing block 3 with the intermediate member 4 is hydraulically placed under pressure relative to the abutment 6 and the annular piston 9. This pressure forces the piston 9 against the U-shaped shims 10 which are thus pressed against the abutment 6. For permitting disassembly of the annular piston, the U-shaped inserts 10 can be taken off the set screw 5.

When the oil pressure is being applied in the annular space 8, the intermediate member 4 and the bearing block 3 move toward the drum 1 and relieve the set screw 5 of the load. The set screw 5 can now be turned easily until it again engages the intermediate member 4. Thereafter, the oil pressure is reduced so that the set screw 5 is again subjected to the full force.

In each single operation, the bearing block can be displaced in this manner by the stroke length of the hydraulic piston. By inserting or removing the U-shaped shims, this operation can be repeated several times until the head of screw 5 or the annular piston is directly in contact with the abutment.

What is claimed is:

A journalling device for a supporting roller of a rotary kiln, tube mill or the like rotatable cylindrical structure, comprising a fixed base having an abutment, a roller-bearing block displaceable on said base toward and away from said abutment, a set screw in threaded engagement with said abutment, a pressure member interposed between said screw and said block and having an annular chamber coaxial to said screw, an annular piston coaxially slidable in said chamber and engageable with said abutment when said chamber is under pressure, said chamber having channel means for connection to a source of pressure medium, whereby said piston, when being pressed by pressure medium against said abutment, permits temporarily relieving said set screw.

References Cited in the file of this patent
UNITED STATES PATENTS

| | | |
|---|---|---|
| 2,197,432 | Kingsbury | Apr. 16, 1940 |
| 2,336,417 | Peterson | Dec. 7, 1943 |
| 3,036,823 | Taylor | May 29, 1962 |